(12) United States Patent
Kennon

(10) Patent No.: US 12,014,344 B2
(45) Date of Patent: Jun. 18, 2024

(54) VENDING MACHINE SYSTEM

(71) Applicant: Calvin Kennon, Tacoma, WA (US)

(72) Inventor: Calvin Kennon, Tacoma, WA (US)

( * ) Notice: Subject to any disclaimer, the term of this patent is extended or adjusted under 35 U.S.C. 154(b) by 112 days.

(21) Appl. No.: 17/380,592

(22) Filed: Jul. 20, 2021

(65) Prior Publication Data

US 2022/0027882 A1   Jan. 27, 2022

Related U.S. Application Data

(60) Provisional application No. 63/055,006, filed on Jul. 22, 2020.

(51) Int. Cl.
  *G06Q 20/20* (2012.01)
  *B64C 39/02* (2023.01)
  *G06Q 20/18* (2012.01)
  *G07F 11/00* (2006.01)
  *B64U 10/13* (2023.01)
  *B64U 101/60* (2023.01)
  *G05B 15/02* (2006.01)

(52) U.S. Cl.
  CPC ......... *G06Q 20/203* (2013.01); *B64C 39/024* (2013.01); *G06Q 20/18* (2013.01); *G07F 11/00* (2013.01); *B64U 10/13* (2023.01); *B64U 2101/60* (2023.01); *G05B 15/02* (2013.01); *G06Q 20/204* (2013.01)

(58) Field of Classification Search
  CPC .... G06Q 20/203; G06Q 20/18; G06Q 20/204; B64C 39/024; G07F 11/00; G07F 9/006; G07F 11/16; B64U 10/13; B64U 2101/60; G05B 15/02
  See application file for complete search history.

(56) References Cited

U.S. PATENT DOCUMENTS

| | | | | |
|---|---|---|---|---|
| 6,010,064 | A * | 1/2000 | Umeda | G07F 7/00 235/375 |
| 9,256,852 | B1 * | 2/2016 | Myllymaki | G06Q 10/083 |
| 10,515,349 | B1 * | 12/2019 | Bryant | H04W 4/023 |
| 10,613,803 | B2 * | 4/2020 | Wushour | G06Q 30/06 |
| 11,935,347 | B1 * | 3/2024 | Philbrick | G06Q 10/08355 |
| 2010/0217433 | A1 * | 8/2010 | Son | G07F 9/02 40/601 |
| 2016/0066732 | A1 * | 3/2016 | Sarvestani | A47G 29/141 232/24 |
| 2018/0058864 | A1 * | 3/2018 | Lection | G01C 21/3415 |
| 2018/0196422 | A1 * | 7/2018 | Chow | B64C 39/024 |
| 2018/0276611 | A1 * | 9/2018 | Dromerhauser | G06Q 10/0833 |
| 2019/0051087 | A1 * | 2/2019 | Goldberg | G05D 1/0088 |
| 2019/0051090 | A1 * | 2/2019 | Goldberg | G07F 9/001 |
| 2019/0333036 | A1 * | 10/2019 | Bryant | G06Q 30/0643 |

(Continued)

*Primary Examiner* — Peter Ludwig
(74) *Attorney, Agent, or Firm* — Brennan, Manna & Diamond, LLC

(57) ABSTRACT

This present invention relates to a novel vending machine system that stores a variety of items, such as clothing, food, and more, to fulfil the desires and requirements of various users. The novel vending machine system features various storage compartments, a dispenser tray, a user interface, a trash bin, a drone delivery mechanism, a staff tech room and much more to enhance the functionality of conventional vending machines. The vending machine system has spacious storage compartments to store, organize, and display a variety of items for purchase, including everyday necessities as well as seasonal items.

9 Claims, 3 Drawing Sheets

(56) References Cited

U.S. PATENT DOCUMENTS

| | | | |
|---|---|---|---|
| 2019/0369641 A1* | 12/2019 | Gillett | B62D 57/028 |
| 2020/0050408 A1* | 2/2020 | Wushour | B64U 10/13 |
| 2020/0167722 A1* | 5/2020 | Goldberg | G06Q 10/0832 |
| 2020/0202284 A1* | 6/2020 | Singh | G05D 1/102 |
| 2020/0288895 A1* | 9/2020 | Bennet | H04W 12/03 |
| 2021/0224739 A1* | 7/2021 | Sweeny | G06Q 10/083 |
| 2021/0284450 A1* | 9/2021 | Wang | B65G 1/0435 |
| 2024/0037487 A1* | 2/2024 | Clise | G06Q 10/08355 |

* cited by examiner

VENDING MACHINE SYSTEM

CROSS-REFERENCE TO RELATED APPLICATION

The present application claims priority to, and the benefit of, U.S. Provisional Application No. 63/055,006, which was filed on Jul. 22, 2020 and is incorporated herein by reference in its entirety.

FIELD OF THE INVENTION

The present invention relates generally to the field of vending machines. More specifically, the present invention relates to a novel vending machine system for dispensing both food and/or non-food items. The improved vending machine features several touchscreen menus that enable a user to select an item for purchase, and supports both cash and cashless payments. The improved vending machine comprises multiple internal compartments for sorting through a catalog of items, and displaying the same for purchase. Additionally, a staff or technician room is also provided within the improved vending machine to manage, change and refill the items inside the compartments, and to work on any technical or mechanical issues within the improved vending machine. Accordingly, the present disclosure makes specific reference thereto. Nonetheless, it is to be appreciated that aspects of the present invention are also equally applicable to other like applications, devices and methods of manufacture.

BACKGROUND OF THE INVENTION

By way of background, vending machines have been used across the world for conveniently dispensing relatively small items, such as drinks, beverages, snacks, tobacco products or the like. A vending machine is an automated machine that stores and dispenses a limited quantity of items on demand upon receiving user-inputted instructions and payment for the selected item. Although vending machines located in public places, such as convenient stores, may only contain a limited type or number of items, customers may purchase other non-stocked items from the convenience store since they are not available for purchase through the vending machine. However, vending machines located in remote locations, such as on the side of highways in a rest stop, offer only a limited number and/or type of items and may not be frequently replenished. Additionally, vending machines placed along highways may be utilized by a large number of travelers, such that the vending machine may frequently run out of favorite items and may be difficult to keep amply stocked. Further, travelers on a long trip may have an urgent need to purchase a particular item dispensed by such vending machines, only to be disappointed and inconvenienced when discovering that the vending machine is either out of stock or does not possess the desired or needed item. Current vending machines may not offer enough choices or inventory for customers when located within convenience stores, next to highways, etc. Therefore, individuals may desire an improved vending machine that can fulfil their needs and requirements.

Further, current vending machines operate on the basic principle that a customer selects an item and inserts coins and/or paper money for the selected item, and the requested item is then dispensed. However, nowadays people do not carry much cash and prefer going cashless while shopping, travelling or in other scenarios. In such a case, an individual without cash may not be able make a purchase from the vending machine since they require some form of money to be inserted into the machine. Additionally, people with a limited amount of money in their wallet may want to save their cash for emergency purposes or places that do not accept credit cards and may not want to use their cash in purchasing items from the vending machines. This poses a dilemma among individuals and causes inconvenience while travelling.

Furthermore, current vending machines dispense the items from the machine through a slot or door for the user to take directly from the machine. In some cases, the users would prefer to have the purchased item delivered to their home or some other destination rather than having to take the item with them at the time of the purchase from the vending machine. Currently, existing vending machines fail to provide this flexible delivery service to its users.

Additionally, the servicing and maintenance of existing vending machines require a lot of time and effort of support staff. In the event that the vending machine becomes inoperable or requires replenishing, individuals may have to wait for a long period of time until the vending machine is re-stocked and returned to a working condition. This too causes inconvenience to the individuals travelling on a long trip since they may not be able to easily drive to another vending machine or convenience store.

Therefore, there exists a long felt need in the art for an improved vending machine that can fulfil the needs and requirements of its users, and that can stock a large variety and quantity of items. Additionally, there is a long felt need in the art for an improved vending machine that includes both cash and cashless payment options for purchasing items from the vending machine, and that enables users to both order and pay for items from the improved vending machine and have the items delivered to their requested destination. Further, there is a long felt need in the art for a vending machine that can be easily serviced and maintained by support staff, and that does not require much effort or time from the staff members. Finally, there is a long felt need in the art for a comprehensive vending machine that is relatively inexpensive to produce, and is both safe and easy to maintain and use.

The subject matter disclosed and claimed herein, in one embodiment thereof, comprises an improved vending machine for storing and dispensing items to individuals on demand. The novel vending machine comprises a plurality of storage compartments for keeping a variety of different items, a user interface, a drone station for enabling drone-based item or package delivery, a tray for holding items dispensed from the various storage compartments, a package dispensing and delivery management module, a lighting system having a plurality of lights, a computer software program for managing the operation of the vending machine, a trash bin for receiving packaging materials from the purchased items, and a control room within the improved vending machine for staff members to maintain and service the vending machine. The storage compartment of the improved vending machine comprises a plurality of shelves that are designed to store and organize various types of items in relatively large quantities. Also, the improved vending machine includes additional internal storage space to maintain a relatively large stock of items for replenishing the shelves as needed.

In this manner, the novel vending machine of the present invention accomplishes all of the forgoing objectives, and provides a relatively easy, convenient and comprehensive automatic vending machine for dispensing different items as per the needs and requirements of users. The enhanced vending machine of the present invention is also user friendly since the machine can offer seasonal items as well as year-round necessities, and further provides a remote delivery service and is also relatively easy to service and maintain.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a unique and automated vending machine for storing and dispensing items based on the selection of users. The improved vending machine comprising a plurality of storage compartments for retaining a variety of different items, a user interface, a drone station for enabling drone-based package delivery of purchased items, a tray for holding items dispensed from the storage compartments, a package dispensing and delivery management module, a lighting system including a plurality of lights, a custom computer software program for managing the operation of the novel vending machine, a built-in trash bin and a staff tech room for allowing staff members to maintain and service the various components of the novel vending machine and related drones. The storage compartment of the improved vending machine further comprises a plurality of shelves to keep and organize various types of items in relatively large quantities. Also, the improved vending machine includes an internal storage space to maintain a relatively large inventory of items for replenishing the shelves as needed.

In a further embodiment of the present invention, the improved vending machine features both cash and cashless payment modes to enable a user to purchase items using cash, credit/debit cards or other payment means. A payment processing module determines the price of the selected item and compares the cash deposited through the cash submission unit or the amount deducted through the credit/debit card, to the item price, and in case of a successful and correct transaction, the required item is dispensed or delivered by the vending machine to the purchaser, either at the point of sale or via the related drone delivery service.

In a further embodiment of the present invention, a method of operating the improved vending machine system of the present invention is disclosed to select an item and further dispense the item as per the desires of the user. The steps of the method comprise initially selecting an item to purchase by using a user interface. The selected item is checked for its availability and, if the item is available, the user is then prompted for payment. If the item is not available (i.e., from the machine itself or from the associated storage area) the user is asked to make a different selection. Next, the user selects the mode of payment and the mode of delivery for the selected item. Then, the payment transaction is completed via the selected payment mode, and finally the item is processed and delivered, either at the point of sale or to a remote location that is within a predefined geographic boundary by the associated drone delivery service.

In a further embodiment of the present invention, a method of dispensing items from the improved vending machine is disclosed. The method comprises the steps of: (a) initially accepting a user selection of a specific item; (b) confirming the availability of the selected item; (c) accepting the cash or cashless payment through the payment acceptor section; (d) processing the payment; and, upon a successful payment transaction; (e) dispensing the selected item to the receiving tray or delivering the selected item through a drone delivery system to the user's requested destination, provided that the same is within the predefined geographic boundary of the vending machine.

The improved vending machine of the present invention is particularly advantageous as it includes large and spacious storage compartments for storing a multitude of items, wherein the storage compartments further include a plurality of shelves to store and organize items of various types including seasonal items to fulfil the needs and requirements of all users. The novel vending machine of the present invention also includes a staff room for workers or technicians to easily access the internal components of the vending machine so that it can be restocked and serviced when required. Additionally, the drone station of the improved vending machine enables the purchased items to be easily and quickly delivered to the user's requested destination, provided that the same is within the predefined geographic boundary of the vending machine.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION

Figure 1:
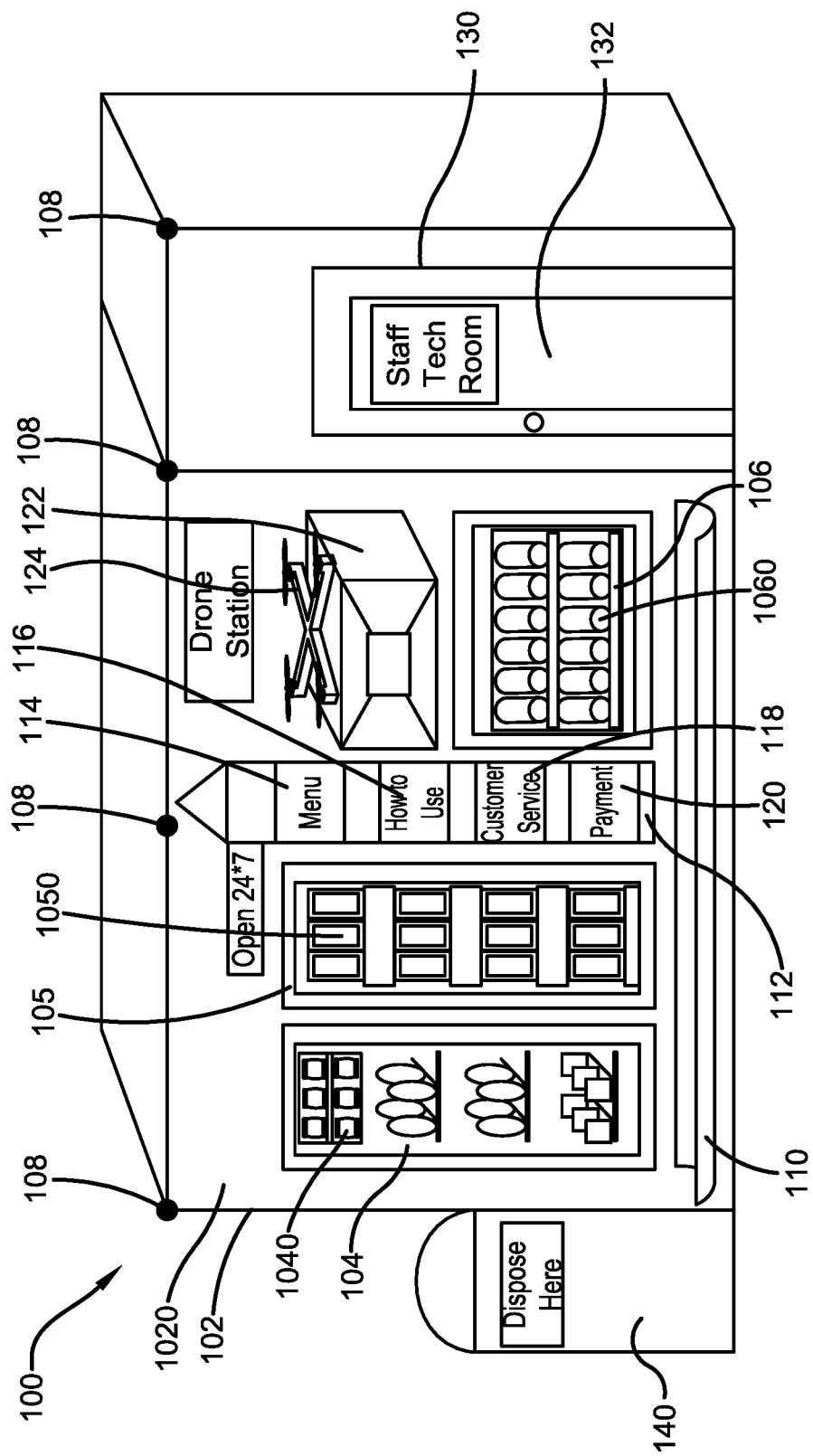
FIG. 1 illustrates a perspective view of one potential embodiment of the vending machine system of the present invention in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long felt need in the art for a vending machine system that can fulfil the needs and requirements of its users, and that can stock a large variety and quantity of different items. Additionally, there is a long felt need in the art for a vending machine system that includes both cash and cashless payment options for purchasing items from the vending machine, and that enables users to both order and pay for items from the vending machine and have the items delivered to their requested destination. Further, there is a long felt need in the art for a vending machine system that can be easily serviced and maintained by support staff, and that does not require much effort or time from the staff members. Finally, there is a long felt need in the art for a comprehensive vending machine system that is relatively inexpensive to produce, and is both safe and easy to maintain and use.

The present invention, in one exemplary embodiment, is a vending machine system that is used for storing and dispensing selected items for its users. The vending machine system comprises a plurality of storage compartments for displaying and storing a variety of items available for purchase, a user interface, a drone station for enabling drone-based package delivery of selected items, a receiving tray for holding purchased items dispensed from the storage compartments, a package dispensing and delivery management module, a lighting system including a plurality of lights, a custom computer software program for managing the operation of the vending machine system, a trash bin and a staff tech room for allowing staff members to restock and service the various components of the vending machine system. The storage compartment of the vending machine system further comprises a plurality of shelves to store and organize various types of items.

Referring initially to the drawings, FIG. 1 illustrates a perspective view of one potential embodiment of the vending machine system 100 of the present invention in accordance with the disclosed architecture. As shown, the vending machine system 100 is an automated vending machine having a generally box-like structure for storing and dispensing a plurality of food and non-food items, wherein the items displayed are made available for purchase. The vending machine system 100 comprises a housing 102 preferably manufactured from stainless steel, galvanized steel, or other similar durable and weather resistant materials that can provide a sturdy structure that is tamper resistant. The vending machine system 100 comprises a plurality of storage compartments 104, 105 and 106, a user interface 112, a drone station 122 and a staff tech room entrance door 132 at the front portion 1020 of the housing 102 of the vending machine 100.

For example, the first storage compartment 104 may comprise a plurality of shelves for storing, organizing and displaying packaged food items 1040, the second storage compartment 105 may comprise a plurality of shelves for storing, organizing and displaying clothes 1050 of different styles, brands, sizes and seasonal items, and the third storage compartment 106 may comprise a plurality of shelves for storing, organizing and displaying beverages and drinks 1060. However, the number of storage compartments is not so limited, and any number of storage compartments may be included in the vending machine system 100 as per the requirements of the user. Additionally, the types of items stored in the compartments is not limited, and other items such as hats, shoes, T-shirts, pants, undergarments, accessories and other clothing items may also be included. Additionally, all the items for purchase from the vending machine system 100, including food and non-food items, can be of different styles, brands and sizes to fulfil the needs of different users.

The user interface 112 preferably comprises various options to operate or interact with the vending machine system 100. For example, the user interface 112 may comprise a menu interface 114 having different options for selecting items, paying for said items 120, a delivery mode and other features; and a how to use interface 116 may provide helpful instructions on how to operate the vending machine system 100 and its various features. For example, the how to use interface 116 may include step-by-step instructions and/or a video demonstration on how to use and operate the novel vending machine system 100. Similarly, the customer service 118 interface provides a way to communicate with staff members including, without limitation, any complaints, compliments, messages, notes or any other feedback. The interface 118 may also include an E-mail address, contact phone number or other information regarding the specific improved vending machine 100 location.

The drone station 122 is a box-shaped portion of the improved vending machine having a top surface forming a resting space for a drone device 124. The drone station 122 comprises an opening at the top surface to allow the drone 124 to pick any item purchased by the user from any of the storage compartments 104, 105, 106 of the vending machine 100, wherein the storage compartments 104, 105 and 106 may be internally connected and in mechanical communication with the drone station 122 to provide the purchased item for delivery to a destination. Additionally, the storage compartments 104, 105 and 106 are internally connected to the receiving tray 110 to enable the purchased item to be dispensed into the receiving tray 110, and to allow the user to pick up the purchased item at the point of sale of the vending machine 100.

The vending machine system 100 further comprises a staff tech room 130, which may be physically attached to the vending machine 100 and/or forms a part of the machine 100. The staff tech room 130 is spacious enough to accommodate one or two staff member or technicians to work inside, primarily for restocking and servicing the vending machine system 100. The staff members may enter the staff tech room 130 through the staff tech room entrance 132 to gain access to the novel machine 100, and further perform servicing of the machine 100. The vending machine 100 may further comprise one or more lights 108 attached to the top of the vending machine 100 for proper lighting of the machine and its contents at night or in other low-light conditions. The lights 108 may be supplied power through a power supply or may be charged through solar panels.

Additionally, a trash bin 140 may be attached to the vending machine 100 to allow the user to dispose of used and undesired packaging from food items, beverages, clothes and other items. More specifically, a user may open the trash bin 140 by pushing a spring loaded opening plate and throw the garbage inside the trash bin 140, wherein the bias in the spring will cause the opening plate to automatically be released back to its original position in order to close the trash bin 140.

Figure 2:
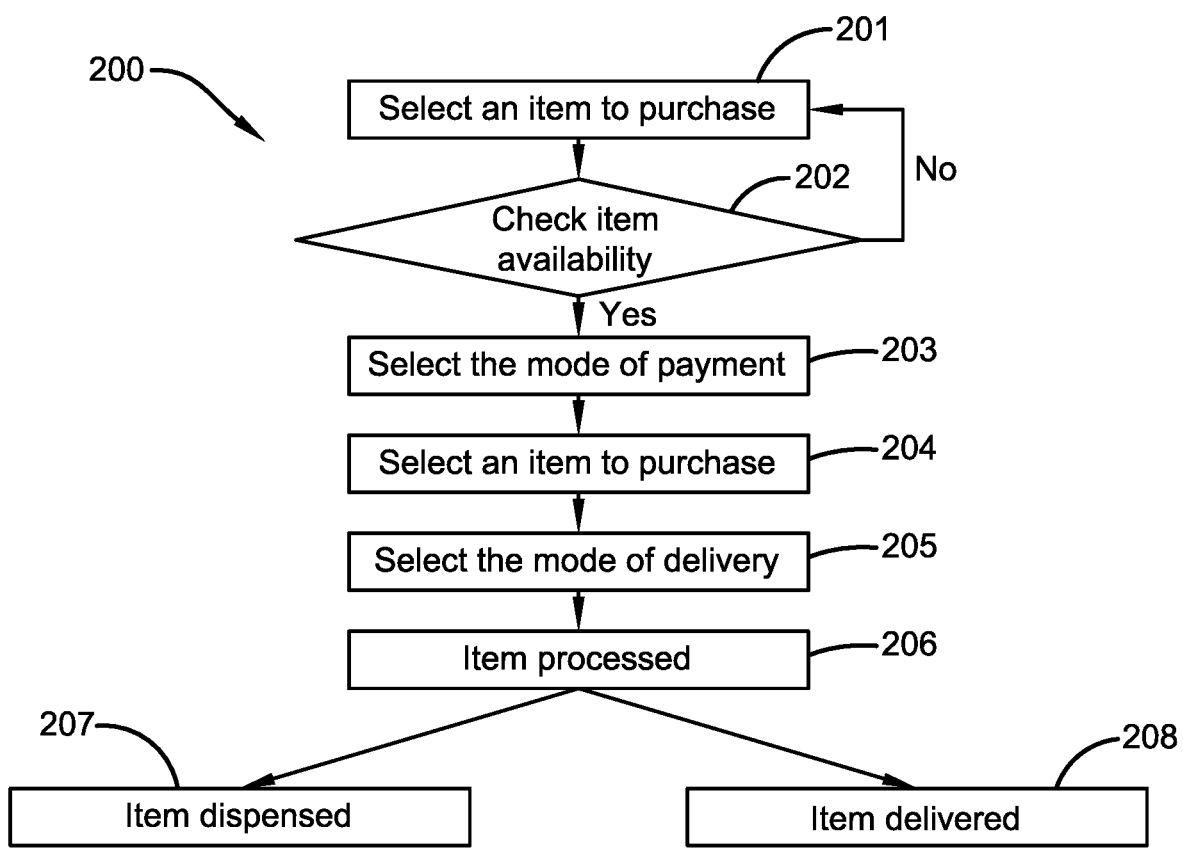
FIG. 2 illustrates a block diagram showing the steps of one potential embodiment of a method of operating the vending machine system of the present invention in accordance with the disclosed architecture.

FIG. 2 illustrates a block diagram showing the steps of one potential embodiment of a method of operating the vending machine system 100 of the present invention in accordance with the disclosed architecture. For example, initially in step 201, a consumer uses a menu interface to navigate through a catalog of items and selects an appropriate item to purchase. Once the user has made his or her selection, a stock management module checks the availability of the selected item at step 202. If the selected item is not available, the user is returned to step 201 and prompted to make a different selection. If the selected item is available, the user is prompted to select a payment mode (e.g., cash, cashless, etc.) in step 203. In the cash payment mode, the user will be required to submit the appropriate amount of cash that corresponds to the desired item and any applicable taxes, delivery fees, transaction fees, etc., through the payment box. In the cashless mode, the user will be permitted to use his or her credit/debit card or any online bank wallet applications to pay for the selected item later in the process.

Once the payment mode has been selected in step 203, the user is then prompted to enter the desired mode of delivery in step 204. For example, the vending machine system 100 of the present invention allows the purchased item to either be immediately dispensed into a receiving tray for ready access to the item by the user, or the user may opt for a later delivery through the drone device 124, and may request the vending machine system 100 to deliver the item to the user's designated destination. The vending machine system 100 may be programmed to charge a fee for such delivery and/or specify a geographic limitation or geofence around the vending machine system 100 beyond which the delivery service will not be made available.

In step 205, the user is prompted to make the payment of the total amount due for the selected items though the selected mode of payment. Accordingly, the user deposits cash, swipes his or her debit/credit card or processes a payment through his or her online banking or electronic wallet using the payment section of the vending machine system 100. Once the payment has been received, the deposited cash is calculated and checked against the item amount, and in case of a successful payment, the vending machine 100 initiates the item processing in step 206.

Alternatively, in case of an online payment, servers associated with the improved vending machine 100 check for a successful transaction and compare the amount received to the total amount of the items purchased, and accordingly initiate item processing 206 in the event of a successful payment. In step 207, if the user selects immediate item delivery mode in step 204, the purchased items are immediately dispensed through the receiver tray of the vending machine 100. In step 208, if the user selects a later or remote delivery to a requested destination in step 204 and said destination is within the above referenced geofence, the purchased items are delivered through the drone delivery component 122, 124 of the vending machine system 100 of the present invention to the requested destination.

Figure 3:
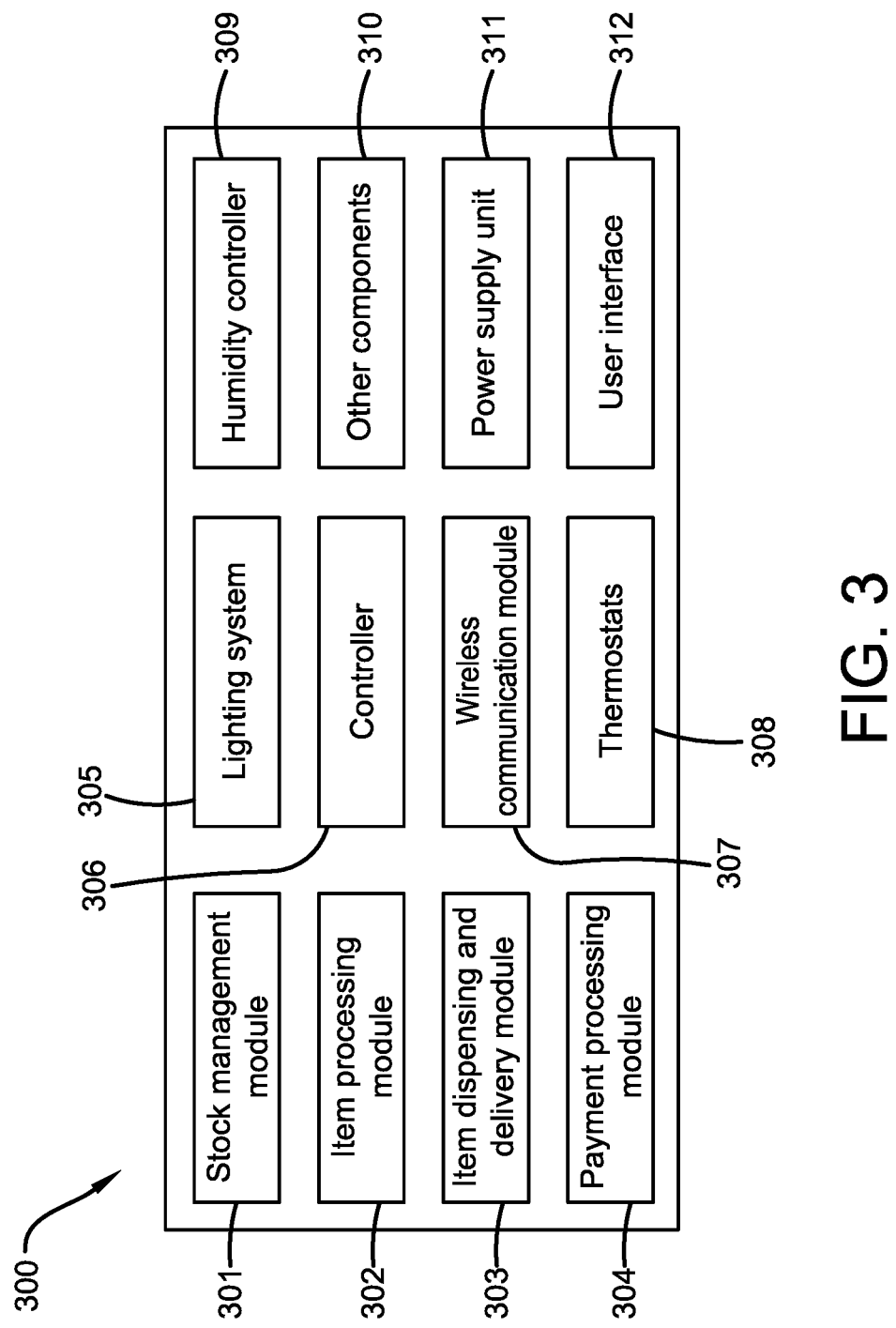
FIG. 3 illustrates a block diagram showing the various components of one potential embodiment of the vending machine system of the present invention in accordance with the disclosed architecture.

FIG. 3 illustrates a block diagram showing the various components of one potential embodiment of the vending machine system 100 of the present invention in accordance with the disclosed architecture. As shown, the vending machine system 100 comprises a stock management module 301, item processing module 302, item dispensing and delivery module 303, payment processing module 304, lighting system 305, controller 306, wireless communication module 307, thermostat 308, humidity controller 309, other components 310, power supply unit 311, user interface 112 and any other component that is needed in the operation of the vending machine system 100.

The stock management module 301 keeps track of the inventory within the vending machine 100 and sends an alert message to the staff members and/or technicians when restocking the novel vending machine 100 is necessary. The alert message may be sent by text message, email or any other known communication method to inform the staff members when the inventory is running low, is out of date or otherwise requires attention. Additionally, the vending machine 100 can be managed remotely using a computer software application or smart phone application to track the saleable items, current inventory and other details.

The item processing module 302 is initiated once the payment transaction is completed and initiates extraction of purchased items from their respective storage compartments 104, 105, or 106, and then initiates dispensing or delivery of purchased items in accordance with the user's instructions as explained above. The item dispensing and delivery module 303 initiates dispensing of items to the receiving tray 110. At the bottom of the vending machine 100, laser or proximity sensors are present to detect when an item has been released and dropped from its storage location. Each laser emitter is paired with an electronic light detector. When the item or product falls, it breaks the path of laser light, thereby signaling to the controller 306 that the purchased item has been dispensed. Accordingly, the stock is then updated by the stock management module 301.

The item dispensing and delivery module 303 further works in coordination with the drone delivery mechanism to enable the vending machine 100 to deliver the purchased item to a requested destination using the drone 124. Once the drone 124 picks up the purchased item from the drone station 122 and delivers it to the destination, the inventory is then updated by the stock management module 301.

The payment processing module 304 processes the payment received from the user and compares the received amount to the total purchase amount, and accordingly directs other modules to process the purchased product. The lighting system 305 comprises a plurality of lights attached to the housing 102 of the improved vending machine 100 to enable the users to view items in low-light conditions and at night. The lights 108 may be powered by any source, such as the power supply unit 311, or may be charged by solar panels. The controller 306 works in coordination with all the other components of the improved vending machine 100 and manages the operation of the improved vending machine. The wireless communication module 307 comprises a Wi-Fi chipset, a LAN connection or other wireless communication mechanism to enable online payment for the purchased items, enable smart alerts to the staff members and to enable communication with servers and much more. Thermostats 308 enable the novel vending machine 100 to maintain different temperatures in different storage compartments specific for the items requiring climate control. The temperature is controlled by thermostats 308 that can be manually adjusted by staff members or can be remotely set by a staff member or technician using the vending machine software application.

The humidity controller 309 maintains the desired humidity level inside the vending machine 100, such that sensitive items, such as tobacco or cosmetic products, are stored at their recommended humidity level. Other components 310, such as optical and ultraviolet scanners, are used to help verify if paper currency received from a user is real or counterfeit, and to determine the monetary denomination of the cash received. The power supply unit 311 supplies the power to the vending machine 100 and its various components and operations. The user interface 112 provides a way for the users to communicate with the improved vending machine 100, and operate the machine 100, by selecting and purchasing different items as per the desires and requirements of the users.

In an embodiment of the present invention, an improved vending machine management software application can be available to track the inventory of the machine, set temperature and humidity levels, manage payment options and other features. The improved vending machine management software can be used remotely by the staff members or technicians to control the operation of the improved vending machine 100.

The storage compartments and the number of shelves in the compartments is not limited and can be designed as per the desires and requirements of the users and manufacturers. Additionally, the housing 102 of the improved vending machine 100 may include advertisements, logo, designs, patterns and the like to provide an appealing aesthetic look to the improved vending machine 100.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "improved vending machine", "novel vending machine", and "modified vending machine" are interchangeable and refer to the vending machine system 100 of the present invention.

Notwithstanding the forgoing, the vending machine system 100 of the present invention can be of any suitable size and configuration as is known in the art without affecting the overall concept of the invention, provided that it accomplishes the above-stated objectives. One of ordinary skill in the art will appreciate that the size, configuration and material of the vending machine system 100 as shown in the FIGS. are for illustrative purposes only, and that many other sizes and shapes of the vending machine system 100 are well within the scope of the present disclosure. Although the dimensions of the vending machine system 100 are important design parameters for user convenience, the vending machine system 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A vending machine system comprising:
   a housing;
   a plurality of storage compartments;
   a drone delivery system comprising a drone station attached to the housing and open at the top;
   a payment processing module;
   a user interface comprising a menu interface and an instructional interface for teaching a user how to use the vending machine system;
   a plurality of lights attached to a top of the housing configured to illuminate both the housing and a plurality of contents retained within the plurality of storage compartments;
   a trash receptacle attached to the housing and comprising a spring loaded plate for accessing an interior of the trash receptacle;
   a control room configured to accommodate two people within integrated within the housing; and
   a receiving tray attached to the housing and internally connected to each of the storage compartments and configured to hold a plurality of items dispensed from each of the storage compartments; and
   wherein each of the storage compartments are internally connected to and in mechanical connection with the drone station.

2. The vending machine system as recited in claim 1 further comprising a package dispensing and delivery management module.

3. The vending machine system as recited in claim 2 further comprising a computer software program.

4. The vending machine system as recited in claim 3 further comprising an internal storage space.

5. The vending machine system as recited in claim 4 further comprising a wireless communication module.

6. The vending machine system as recited in claim 5 further comprising a thermostat.

7. The vending machine system as recited in claim 6 further comprising a humidity controller.

8. The vending machine system as recited in claim 7 further comprising a stock management module.

9. The vending machine system as recited in claim 8 further comprising a power supply unit and a controller.

* * * * *